United States Patent [19]

Kremer et al.

[11] 4,183,996

[45] Jan. 15, 1980

[54] COATED CLOSED CELL FOAM ARTICLE

[75] Inventors: Charles J. Kremer, Brookhaven; Albert C. Condo, Newton Square, both of Pa.; Donald S. Brown, Park Forest, Ill.

[73] Assignee: Atlantic Richfield Company, Philadelphia, Pa.

[21] Appl. No.: 803,486

[22] Filed: Jun. 6, 1977

Related U.S. Application Data

[63] Continuation of Ser. No. 390,963, Aug. 23, 1973, abandoned, which is a continuation of Ser. No. 202,680, Nov. 26, 1971, abandoned, which is a continuation of Ser. No. 878,226, Nov. 19, 1969, abandoned.

[51] Int. Cl.$^2$ .......................... B32B 3/26; B32B 5/18; B32B 27/00
[52] U.S. Cl. ...................................... 428/315; 252/62; 427/443
[58] Field of Search .............................. 427/373, 443; 260/2.5 A, 27 R, 27 EV, 28.5 AV; 428/310, 315; 252/62

[56] References Cited

U.S. PATENT DOCUMENTS

| 3,190,844 | 6/1965 | Milone et al. ............................ 252/62 |
| 3,330,792 | 7/1967 | Gaylord et al. ................. 260/28.5 R |
| 3,417,040 | 12/1968 | Kremer ............................... 260/27 R |
| 3,451,842 | 6/1969 | Kurz et al. ............................ 252/62 |
| 3,471,419 | 10/1969 | Ehrlich ................................. 260/2.5 |
| 3,660,333 | 5/1972 | Kremer ........................... 260/27 EV |

FOREIGN PATENT DOCUMENTS

| 214646 | 4/1958 | Australia . |
| 1000136 | 8/1965 | United Kingdom ...................... 252/62 |

OTHER PUBLICATIONS

Modern Plastics Encyclopedia, vol. 46, No. 10A, p. 265.

*Primary Examiner*—Michael F. Esposito
*Assistant Examiner*—Sadie L. Childs
*Attorney, Agent, or Firm*—John B. Goodman

[57] ABSTRACT

This invention relates to coating compositions containing a wax, an acid component and a polyvinyl alkyl ether having a molecular weight in the range of from 1,000 to 15,000. Most preferably, the polyvinyl alkyl ether is either polyvinyl methyl ether or polyvinyl isobutyl ether. The coatings made from these compositions have highly improved adhesive properties toward the substrate upon which they are deposited. This is true over a wide range of temperatures and especially in the very low temperature range. They can be utilized as hot melt coatings for items such as paperboard and corrugated board. They are especially effective as coatings for polymeric foams, particularly polyurethane foams.

11 Claims, No Drawings

COATED CLOSED CELL FOAM ARTICLE

This is a continuation, of application Ser. No. 390,963, filed Aug. 23, 1973, now abandoned which is a continuation of application Ser. No. 202,680, filed Nov. 26, 1971, now abandoned, which application is a continuation of application Ser. No. 878,226 filed Nov. 19, 1969 now abandoned.

BACKGROUND OF INVENTION

In the coating of various substrates such as paper and polymeric foams, it is difficult to find a coating which will provide a waterproof barrier over a wide range of temperatures. Many coatings which perform satisfactory at ambient temperatures of about 70° F. crack, blister and peel if the temperature of the substrate is lowered below 0° F. At the same time some polymeric foams, such as polyurethane foams, are susceptible to extensive damage if they are permitted to come in contact with water for any considerable length of time. In order to use these polymeric foams as insulators at low temperatures attempts were made to coat the material with some well-known polymeric coatings such as polyesters, polyamides, polyepoxides, synthetic rubber, starch based glues etc. However, in each case the coatings cracked, blistered and peeled at temperatures of around −60° F.

It has now been discovered that particular blends of wax, acid component and a polyvinyl alkyl ether provide an adequate water proof barrier to the substrate upon which it is deposited over a wide temperature range. These coatings have withstood temperatures as low as −300° F. without cracking, peeling or blistering.

Therefore, it is the object of this invention to provide a wax coating compositions which have improved adhesion between the coating and the substrate.

It is also the object of this invention to provide coated polyurethane foam compositions which have improved resistance to water deteriation at low temperatures.

SUMMARY OF INVENTION

In general the compositions of this invention comprise in parts by weight

A. 100 parts of a wax having a melting point of greater than 120° F.

B. from 5 to 70 parts of a polyvinyl alkyl ether having an average molecular weight ranging from 1,000 to 15,000.

C. a wax-compatible, non-corrosive carboxylic acid in an amount sufficient to impart to the composition a total acid number ranging from 5 to 200, said acid itself having an acid number in excess of 20.

The wax component utilized in the composition of this invention can be of mineral, vegetable, animal or synthetic origin or mixture thereof. The waxes must have a melting point greater than 120° F. Exemplary mineral origin waxes are the petroleum waxes, ozocerite and montan wax, etc. The petroleum and ozocerite waxes are comprised essentially of paraffinic hydrocarbons, whereas the montan wax is comprised essentially of high molecular weight esters, with traces of alcohols and acid also present. Examples of vegetable origin waxes are carnauba, candelilla, Japan waxes and the like. Animal waxes suitable for use in the practice of this invention are beeswax, Chinese wax, insect wax and similar waxes. The main constituent of vegetable and animal origin waxes are high molecular weight esters and saturated hydrocarbons with smaller amounts of higher molecular weight alcohols and acids also being present. Exemplary synthetic waxes are those produced by the esterification with polyhydric alcohols, the hydrogenation of vegetable oils and those made by the Fischer-Tropsch Synthesis etc.

As noted above, certain waxes are composed of mixtures of chemical compounds which include minor amounts of acids. Generally, however, these waxes do not have an acid number in excess of 20. It is therefore necessary that the acid component be added in order to impart the minimum required acid number to the composition.

The use of petroleum waxes represents a preferred embodiment of this invention. These waxes include paraffin waxes which have a melting point from 120° F. to 200° F. and the microcrystalline waxes having a melting point from 140° F. to 210° F. These waxes may be fully refined and thus contain very small amounts of hydrocarbon oils or they may be semi-refined (slack waxes) and have hydrocarbon oil contents of up to about 15 percent.

The most preferred compositions of this invention utilize a wax component containing either 100 percent by weight paraffin wax or from 20 to 80 percent by weight of a paraffin wax having a melting point ranging from 120° F. to 180° F. and from 80 to 20 percent of microcrystalline wax having a melting point ranging from 140° F. to 200° F. These wax components provide compositions which may be utilized in high temperature applications. Increasing the concentration of microcrystalline wax will impart a higher maximum use temperature and improve the ultimate physical strength and performance while decreasing dimensional stability.

The second component which is critical to the practice of this invention is a polyvinyl alkyl ether which is a liquid or semi-solid at 70° F. depending on the molecular weight. These polyvinyl ethers have the following structural formula:

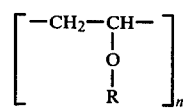

wherein R is an alkyl radical containing from 1 to 4 carbon atoms and "n" is an integer which defines the molecular weight of the polymer by designating the chain length. Specifically, under the above formula the polyvinyl ethers can be methyl, ethyl, propyl or butyl ethers. Most preferably, the polyvinyl ether is either the methyl or the isobutyl ether. These polymers have average molecular weights ranging from about 1,000 to about 15,000 and preferably range from about 3,000 to about 9,000. With respect to the unit structure, when R is methyl the molecular weight of the repeating unit is 58. When R is butyl the molecular weight of the structure is 100. Therefore, "n" broadly can range from about 10 to about 260. In the preferred molecular weights it ranges from about 30 to 160. These polyethers can be prepared by any of the art-recognized polymerizations such as those utilized in U.S. Pat. No. 2,104,000 and 2,061,934.

These polyvinyl ethers are incorporated into the wax compositions in amounts ranging from about 1 to about 35 weight percent. Based on 100 parts wax this loading corresponds from 5 to about 70 parts by weight polyvinyl ether. Most preferably, the polyvinyl ether is present in an amount ranging from about 15 to about 50 parts by weight per 100 parts by weight wax. Since most polyvinyl ethers are wax incompatible especially at the higher molecular weights the amount of acid used must be varied to insure complete solubility. Polyvinyl methyl ether is wax incompatible at almost any molecular weight level and needs about 6 parts acid for each part added to the blend.

The third ingredient which is critical to the practive of this invention is the acid component. In general, any carboxylic acid which is wax-compatible, non-corrosive and has an acid number in excess of 20 can be utilized in the compositions of this invention. It should be understood that a mixture of carboxylic acids can also be used in the compositions of the present invention. The carboxylic acid must not be corrosive to the extent that it will attack the metal parts of equipment or containers or will react with the foam. In general, the lower molecular weight carboxylic acids such as, for example, formic, acetic, propionic, benzoic acids and the like are very corrosive and in addition are generally incompatible with the other components.

The carboxylic acid preferably should have an acid number in excess of about 30 although acids with a lower acid number, i.e., about 20, can be used. Materials with a lower acid number, i.e., those of higher molecular weight are not desirable because they increase the viscosity of the molten composition without imparting corresponding or comparable increases in the desired properties. Acid number is used herein as it is normally understood by those skilled in the art, i.e., it is the number of milligrams of alcoholic potassium hydroxide required to neutralize 1 gram of the substance being tested in the presence of methyl orange. Any aliphatic, alicyclic or aromatic acid having one or more carboxyl groups may be used in the compositions of this invention provided, however, that such acids are wax-compatible, non-corrosive and have an acid number in excess of about 20. The aliphatic carboxylic acids can be saturated or unsaturated. Exemplary saturated aliphatic carboxylic acids are nonanoic acid, lauric acid, tetradecanoic acid, pentacosanoic acid, natural occurring acids such as for example coconut fatty acid and tallow fatty acid, sebacic acid, 2-butyl-2-ethyl glutaric acid, and 2-propyl-1,2,4-pentane tricarboxylic acid. Exemplary unsaturated aliphatic carboxylic acids are oleic acid, linoleic acid, linolenic acid, and 5-octene-3,3,6-tricarboxylic acid. The alicyclic carboxylic acid may be saturated or unsaturated. Exemplary saturated alicyclic carboxylic acids are the naphthenic acids (cycloparaffinic acids), including those which have one or more alkyl side chains of varying length such as cyclohexane pelargonic acid. Exemplary unsaturated alicyclic carboxylic acids are abietic acid and acids obtained by dimerizing or trimerizing higher molecular weight unsaturated fatty acids such as oleic or linoleic acid. Aromatic acids such as naphthoic, anthroic, alkyl substituted phthalic acid, and alkyl substituted naphthalic acid may also be used in the practice of this invention.

Carboxylic acids that contain functional groups other than the carboxylic group such as aldehyde, keto or hydroxyl groups can also be used in the compositions of this invention provided, however, that the functional group does not hinder the carboxyl moiety. Consequently, acids such as 12-hydroxy-stearic acid and oxidized petroleum waxes having an acid number in excess of about 20 can be also utilized in the compositions of this invention. Acids containing small proportions of other elements such as nitrogen, sulfur, oxygen, phosphorous etc. can also be utilized provided the additional elements do not hinder the carboxyl moiety. Examples of various acids which can be utilized are set forth in U.S. Pat. No. 3,417,040 which is hereby incorporated by reference into this application.

A preferred carboxylic acid is abietic acid, a source of which is wood rosin which contains more or less abietic acid depending on how it is chemically modified. Thus the products of wood rosin which have been subjected to such chemical treatments as isomerization, air oxidation, hydrogenation, disproportionation, or dimerization are also suitable as the carboxylic acid component. By subjecting the wood rosin to any of the above treatments, the relative amounts of the acids which comprise the wood rosin are changed and consequently, the properties of the wood rosin may be varied to obtain the particularly desired properties. For instance, by oxidizing the wood rosin, it is possible to obtain a product with an increased softening point. Hydrogenation of the wood rosin results in a product with improved color stability. By submitting the wood rosin to disproportionation, a product with improved oxidation resistance is obtained. Dimerization of the wood rosin yields a product of higher softening point. The methods of modifying wood rosin by any one of the above chemical operations are well-known to those skilled in the art and the products obtained therefrom are available commercially.

Superior properties results from the use of an acid component which contains both an acid and a liquid. This can be accomplished by either using a liquid acid or by using a solid acid (such as rosin) in combination with a liquid acid or nonacid. This combination should contain at least 35 weight percent of an organic acid having an acid number greater than 20. Secondly, it should contain at least 5 weight percent of an organic liquid. Both the organic acid and the organic liquid should have a boiling point greater than 300° F. at 7 mm. of mercury and both should be compatible with the wax and polyvinyl ether at the temperature at which the hot melt coating is being applied. Most preferably, the organic acid has an acid number in excess of 30 and is present in the acid component in an amount in excess of 50 weight percent. Preferably, the organic liquid is present in the acid component in an amount in excess of 20 weight percent.

While the preferred acid component must contain both an acid and a liquid, both of these requirements can be satisfied by utilizing an organic carboxylic acid which is also a liquid at 70° F. On the other hand, both liquid organic acids and liquid organic non-acids can be used in the same composition if desired. For example, liquid acids such as the oligomers of fatty acids can be utilized alone or with a solid organic acid or a liquid organic non-acid. If a liquid organic carboxylic acid is used, it must have a melting point below 70° F., have a viscosity at 100° F. ranging from 500–10,000 SSU, have a molecular weight ranging from 400–2500 and have an acid number in excess of 20. Preferably, the acid has a viscosity at 100° F. ranging from 500–2,000 SSU and an average molecular weight ranging from 400–800. Preferred liquid acids are the dimerized and trimerized fatty acids containing from 16–22 carbon atoms; for example, dimerized or trimerized oleic, arachidonic, sorbic or eicosenic acids. Most preferred are the dimerized, and trimerized eighteen carbon fatty acids, such as dimerized or trimerized oleic or linolenic acids.

Organic carboxylic acids which are not liquids at 70° F. can be utilized if combined with at least 5 weight percent of an organic liquid. This solid organic carboxylic acid must have an average molecular weight ranging from 150 to 1500 and an acid number in excess of 20. Preferably, this acid has an average molecular weight ranging from 400–800 and has a melting point ranging from 120°–200° F. A preferred solid organic carboxylic acid is abietic acid which is commonly found in wood rosins.

The organic liquids which can be utilized in the practice of this invention must be liquids at 70° F. and have a boiling point greater than 300° F. at 7 millimeters of mercury. As previously stated, the acid component must contain at least 5 percent of a liquid organic acid or a liquid organic non-acid. If a liquid organic non-acid is utilized it must be a hydrocarbon compound selected from the group consisting of oils or a styrene, butene or propene polymer.

The oil which can be utilized as an organic liquid can be any hydrocarbon oil having a viscosity at 100° F. ranging from 300–3,000 SSU. Preferably, the oil has a viscosity at 100° F. ranging from 500–1500 SSU. The most preferred oil is a refined white oil.

The styrene polymers which can be utilized as the organic liquid in this invention must have a viscosity at 100° F. ranging from 800–100,000 SSU and an average molecular weight ranging from 300–3,000. Preferably, the viscosity at 100° F. ranges from 800 to 3500 SSU and the average molecular weight ranges from 300–1500. These polymers can be prepared by polymerizing various styrene monomers to produce low molecular weight polymers. A mixture of styrene monomers can also be polymerized. For example, suitable polymers can be derived from styrene, alpha-methyl styrene or alkylated styrenes such as alkylated alpha-methyl styrene, alkylated alpha-methyl paramethyl styrene, or alkylated para-methyl styrene or mixtures thereof. A particularly suitable polymer of this type is produced by the simultaneous alkylation and polymerization of monomeric styrene, alpha-methyl styrene, alpha-methyl paramethyl styrene, para-methyl styrene or a mixture of these monomers.

The liquid butene polymers which can be utilized as the organic liquids in this invention must contain at least 90 percent by weight butene and have a viscosity at 100° F. ranging from 1000 to 1,000,000 SSU and an average molecular weight ranging from 300–12,000. Copolymers containing butene and up to 10 percent of another lower mono-olefin can also be utilized. Preferably the butene polymer is a homopolymer which has a viscosity at 100° F. ranging from 10,000 to 200,000 and an average molecular weight ranging from 800–3000. Most preferably the average molecular weight ranges from 1600 to 2500. The most preferred butene polymer is one prepared by the polymerization of butene-1 or isobutylene.

The propene polymer which can be utilized as an organic liquid in this invention has a viscosity at 100° F. ranging from 10,000–1,000,000 SSU and an average molecular weight ranging from 800–3500. Preferably, this polymer has a viscosity at 100° F. ranging from 20,000 to 50,000 SSU and an average molecular weight ranging from 1000 to 2000.

Preferred compositions can be prepared by utilizing as the acid component a mixture of rosin acid and dimerized fatty acids or a mixture of rosin acid and styrene polymer. For example, the acid component can contain from 70 to 95 percent by weight rosin acid and from 5 to 30 percent by weight of a dimer of 9,12-octadecadienoic acid or a styrene homopolymer.

The acid component is incorporated into the composition of this invention in an amount sufficient to impart thereto an acid number ranging from 5–200. Most preferably, it is present in an amount sufficient to impart an acid number ranging from 10–75. The concentration of acid component necessary to impart the required acid number will, of course, depend on the particular acid utilized, but generally it ranges from 10 to 150 parts by weight per 100 parts wax.

Ingredients commonly added to wax or polyvinyl alkyl ethers can be incorporated into the compositions of this invention in functional amounts without departing from the scope thereof. Examples of these ingredients include but are not limited to: heat and ultraviolet light stabilizers, inert fillers, secondary plasticizers, biocides, germicides, fungicides, anti-blocking agents, pigments and colorants, anti-oxidants, gloss stabilizers, viscosity-index improvers, solvents, anti-scuff agents, etc. Specifically, ingredients such as the solid glycol esters of rosin acids can be added to improve color, odor and heat stability.

The preparation of the compositions of this invention is not critical to the practice of it. For example, these compositions can be prepared by heating the wax to a temperature above its melting point, adding the acid component, polyvinyl alkyl ether and other additives and agitating vigorously until a homogeneous hot melt is obtained. It has been found, however, that the acid component facilitates the dispersion of the polymer. Therefore, if this method is used it is preferable to incorporate the acid component into the melted wax prior to the addition of the polyvinyl alkyl ether. A specific method for preparation is as follows: the waxes are melted together, any anti-oxidants or heat stabilizers are added and the melt is then brought to a temperature about 275° F. The acid component is heated to about 275° F. and added to the hot wax. The polyvinyl alkyl ether is then added to the melt accompanied by vigorous stirring while maintaining the melt temperature above about 240° F. After all of the polymer has been added the melt is agitated until the composition is homogeneous. As described in U.S. Pat. No. 3,417,040 the masterbatch system can be used. In this method the polymer is first mixed with the acid component by combining them at a temperature in excess of 250° F. When this blend is homogeneous it is added to the molten wax.

The wax compositions of this invention are particularly suited for coating polymeric foams such as polystyrene, polyurethane, polyvinyl chloride, polyepoxide and polyolefin foams. It is especially effective as a coating for polyurethane foams which are very susceptible to degradation by water. The polyurethane foams are normally prepared by reacting a liquid having a reactive hydrogen with an organic diisocynate in the presence of a gas generating reactant and a suitable catalyst. Examples of methods of producing polyurethane foams are shown in U.S. Pat. Nos. 3,201,359; 3,227,666; 3,242,109; 3,277,027 and 3,326,821 which are hereby incorporated by reference. The coatings may be applied to the foam by any of the conventional methods such as dip, spray, roll or solvent coating.

The following examples are given to illustrate specific embodiments of this invention. All parts are by weight.

EXAMPLE I

Four inch square by two inch thick solid urethane foam blocks with a closed cell structure were coated with various polymeric coatings in accordance with the manufacturer's instructions. These coatings included a polyester (ARCO Glaze #2), a polyamide (Araldite 502), a polyepoxide (Epon 812), a starch based glue (Union Bag Special 500) and a modified butyl rubber (Kraton 101). The coated foams were packed in dry ice (−65° F.) and examined after 15 minutes. In all cases the protective coatings showed severe blistering and/or peel-off tendencies. With the foams coated with the glue and polyester complete delamination took place.

EXAMPLE II

The ingredients listed in the Table were blended as follows: the rosin acid was heated to a temperature between 240° F. to 260° F. The polyvinyl alkyl ethers were then added to the acid with agitation while maintaining the temperature in the above range. When both polyvinyl isobutyl ether and polyvinyl methyl ether were used in the same formulation the polyvinyl isobutyl ether was added first. In a separate container the wax was heated to 180°–200° F. Rosin acid mixture was then added to the molten wax and stirred until homogeneous. Formulation No. 3 used an additional acid (dimerized fatty acid) which was added to the molten was rather to the rosin/polyether mixture.

Four inch square by two inch thick solid urethane foam blocks with closed cell structure were dip coated in the above blends @ 230° F. After allowing the coatings to reach ambient temperatures they were dipped in liquid nitrogen. Formulation No. 3 had no blistering peeling or cracking. Formulation No. 1 had very slight cracks but showed no blistering or peeling. Formulation No. 2 showed very slight blistering undoubtedly caused by the high percentage of rosin which causes the coating to become somewhat brittle. The blocks were then immersed in water for 72 hours. They were weighed before and after submersion but did not show any signs of water pickup.

It has also been found that these coating compositions have an outstanding capacity for pigments such as aluminum or titanium dioxide. Even at high loadings the pigments did not have a tendency to rub-off from the coatings.

TABLE

| Formulation Number | 1 | 2 | 3 |
|---|---|---|---|
| Paraffin Wax[1] | 100 | 100 | 100 |
| PVME[2] | — | 25 | 11 |
| PVIBE[3] | 17 | — | — |
| PVIBE[4] | — | — | 33 |
| Fatty Acid[5] | — | — | 11 |
| Rosin Acid[6] | 50 | 125 | 68 |
| Acid Number | 46 | 75 | 47 |

Footnotes for TABLE
[1] A paraffin scale wax having a melting point of 126° F. (ASTM D-87) and a oil content (ASTM D-721) of 1.5%.
[2] Gantrez M-155 - a polyvinyl methyl ether having an average molecular weight of about 12,000.
[3] Gantrez B-209 - a polyvinyl isobutyl ether having an average molecular weight of about 9,000.
[4] Gantrez B-201 - a polyvinyl isobutyl ether having an average molecular weight of about 3,000.
[5] A dimerized 9,12-octadecadienoic acid having a melting point of 35° F., an acid number of 190 and a viscosity @ 100° F. of 1,000 SSU.
[6] Disproportionated wood rosin with a melting point of 181° F. (ring and ball) acid number of 154, saponification of 189 and an average molecular weight of 450.

We claim:
1. A polymeric foam with a closed cell structure having coated on at least one side thereof a composition comprising in parts by weight:
   (A) 100 parts of a wax having a melting point greater than 120° F.;
   (B) from 5 to 70 parts of a polyvinyl alkyl ether having an average molecular weight ranging from about 1,000 to about 15,000; and
   (C) in an amount sufficient to impart to the composition a total acid number ranging from 5 to 200, a wax compatible, non-corrosive carboxylic acid, said acid having an acid number in excess of about 20.
2. A polymeric foam of claim 1 wherein the concentration of polyvinyl alkyl ether ranges from 15 to 50 parts per 100 parts by weight wax.
3. A polymeric foam of claim 1 wherein the polyvinyl alkyl ether has an average molecular weight ranging from about 3,000 to about 9,000.
4. A polymeric foam of claim 1 wherein the wax is a petroleum wax.
5. A polymeric foam of claim 4 wherein the acid is a rosin acid.
6. A polymeric foam of claim 1 wherein the polyvinyl alkyl ether is selected from the group consisting of polyvinyl methyl ether and polyvinyl isobutyl ether.
7. A polymeric foam of claim 1 wherein the acid component has both liquid and acid properties, said component containing at least 35 percent by weight acid and at least 5 percent by weight liquid, all having boiling points greater than 300° F. at 7 millimeters of mercury, said acid being selected from the group consisting of:
   (A) an organic carboxylic acid which is liquid at 70° F., has a viscosity of 100° F. ranging from 500 to 10,000 SSU, and average molecular weight ranging from 400 to 2,500, and an acid number in excess of 20;
   (B) an organic carboxylic acid which has a melting point about 70° F., an average molecular weight ranging from 150 to 1,500, and an acid number in excess of 20; and,
   (C) mixtures of (A) and (B); said liquid being selected from the group consisting of:
   (D) an organic carboxylic acid which is a liquid at 70° F., has a viscosity at 100° F., ranging from 500 to 10,000 SSU, and average molecular weight ranging from 400 to 2,500, and an acid number in excess of 20;
   (E) a hydrocarbon which is a liquid at 70° F. selected from the group consisting of:

(1) an oil having a viscosity at 100° F. ranging from 300 to 3,000 SSU;

(2) a styrene polymer having a viscosity at 100° F. ranging from 800 to 100,000 SSU and an average molecular weight ranging from 300 to 3,000;

(3) a butene polymer containing at least 90 percent weight butene, having a viscosity at 100° F. ranging from 1,000 to 1,000,000 SSU and an average molecular weight ranging from 300 to 12,000;

(4) a propene polymer having a viscosity at 100° F. ranging from 10,000 to 1,000,000 SSU and an average molecular weight ranging from 800 to 3,500; and (F) mixtures of (D) and (E).

8. A polymeric foam of claim 1 wherein the acid component (C) is a mixture containing a liquid acid and a rosin acid.

9. A polymeric foam of claim 1 wherein the acid component is present in an amount sufficient to impart to the composition an acid number ranging from 10 to 75.

10. A polymeric foam of claim 1 wherein the polymeric foam is a urethane foam.

11. A polymeric foam of claim 1 wherein the polymeric foam is a urethane foam and
(A) the wax component is a paraffin wax;
(B) the polyvinyl alkyl ether is selected from the group consisting of polyvinyl methyl ether and polyvinyl isobuty ether and is present in an amount ranging from 15 to 50 parts; and
(C) the acid component is a rosin acid and is present in an amount sufficient to impart to the composition an acid number ranging from 10 to 75.

* * * * *